United States Patent Office 3,193,522
Patented July 6, 1965

3,193,522
STABILIZATION OF POLYESTERS WITH POLYCARBODIIMIDE
Wolfram Neumann, Leverkusen, Hans Holtschmidt, Cologne-Stammheim, Julius Peter, Odenthal, Buchmuhle, and Peter Fischer, Cologne-Stammheim, Germany, assignors to Farbenfabriken Bayer Aktiengesellschaft, Leverkusen, Germany, a corporation of Germany
No Drawing. Filed Nov. 29, 1961, Ser. No. 155,791
Claims priority, application Germany, Dec. 2, 1960, F 32,679
9 Claims. (Cl. 260—45.9)

This invention relates to esters stazbilized against hydrolysis and more particularly to compounds containing a plurality of ester groups, for example, polyesters stabilized against hydrolysis.

It is well known that although many polyesters exhibit suitable physical properties for many applications, the ester groups in the molecule are readily hydrolyzed by moisture and the greater proportion of ester groups present, the greater is the susceptibility toward hydrolyzation. In the polyurethane field, for example, wherein polyesters have been widely used, this disadvantage has necessitated the use of polyethers in applications where contact with moisture is incurred.

It has been heretofore known to use carbodiimides having either one or two carbodiimide groups as stabilizers against the hydrolytic decomposition of plastics based on polyesters. These compounds are effective for the stabilization of polyesters to a certain extent, however, the stabilized polyesters suffer in that the monocarbodiimides and the bis-carbodiimides are readily extracted by solvents or mineral oils, they have a tendency to migrate, exude or bleed out of the polyester compositions, they are ineffective at high temperatures because of their volatility and they have a tendency to undergo polymerization reactions, thereby destroying the reactivity of the carbodiimide group and thus the stabilization action of the composition. Other carbodiimides such as, for example, those containing functional groups including hydroxyl groups, have been used as stabilizers. However, these compounds are capable of reacting with themselves, thereby restricting the storability of the products because the activity is lost. These compounds are also difficult to obtain.

It is, therefore, an object of this invention to provide polyesters stabilized against hydrolysis and ageing. It is another object to provide stabilized polyesters which are not subject to hydrolysis at high temperatures. It is still another object of this invention to stabilize polyester urethanes against hydrolytic degradation and ageing.

The foregoing objects and others are accomplished in accordance with this invention, generally speaking, by providing compositions containing ester groups which are stabilized against hydrolytic degradation by intermixing with the ester-containing composition a polycarbodiimide having a molecular weight of at least about 500 and having more than 3 carbodiimide groups in the molecule, with the proviso that at least one carbodiimide group is present for each molecular weight unit of 1,500. The invention further contemplates the stabilization of polyester compositions wherein a composition containing a plurality of ester groups is stabilized against degradation by the introduction of a polycarbodiimide. The presence of the polycarbodiimides are of importance particularly in plastics containing a plurality of ester groups as any hydrolytic degradation will affect the properties of the product. The form in which the product is fabricated is not controlling for any plastic in the form of lacquers, foils, coatings, fibers, foams, elastomers, casting resins or molded objects has been improved with respect to the hydrolysis resistance by the introduction of polycarbodiimides in accordance with this invention.

Any composition containinng ester linkages

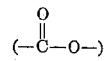

may be stabilized against hydrolytic degradation by the introduction of polycarbodiimides in accordance with this invention such as, for example, the reaction product of a carboxylic acid with an alcohol. Any suitable carboxylic acid may be used in the preparation of compositions containing ester groups in accordance with this invention such as, for example, acetic acid, phenyl acetic acid, benzoyl acetic acid, pyruvic acid, propionyl acetic acid, butyrl formic acid, aceto butyric acid, levulinic acid, 1,2-keto stearic acid, 1,3-keto behenic acid, aldovaleric acid, hexahydrobenzoic acid, 1,2-cyclohexanone carboxylic acid, brassylic acid, phenyl malonic acil, ethyl glycollic acid, thiodiglycollic acid, β-chloropropionic acid, glutaconic acid, ethoxymalonic acid, malic acid, aspartic acid, acrylic acid, methacrylic acid, cinnamic acid, benzene tricarboxylic acid, adipic acid, succinic acid, suberic acid, sebacic acid, oxalic acid, methyladipic acid, glutaric acid, pimelic acid, azelaic acid, phthalic acid, terephthalic acid, isophthalic acid, thiodipropionic acid, maleic acid, fumaric acid, citraconic acid, itaconic acid and the like.

Any suitable alcohol may be used such as, for example, methyl alcohol, ethyl alcohol, propyl alcohol, isopropyl alcohol, n-butyl alcohol, isobutyl alcohol, secondary butyl alcohol, tertiary butyl alcohol, amyl alcohol, hexyl alcohol, octyl alcohol, decyl alcohol lauryl alcohol, myristyl alcohol, cetyl alcohol, stearyl alcohol, allyl alcohol, methallyl alcohol, croty alcohol, 2-propyn-1-ol, oleyl alcohol, geraniol, citronellol, linalool, diacetone alcohol, ethylene glycol monoethyl ether, cyclohexanol, napthenic alcohols, benzyl alcohol, tolyl alcohol, phenyl ethyl alcohol, octadecylbenzyl alcohol, ethylene glycol, propylene glycol, 1,4-butanediol, 1,3-butanediol, 1,5-pentanediol, 1,6-hexanediol, bis-(hydroxy methyl chloro-hexane), diethylene glycol, 2,2-dimethyl propylene glycol, 1,3,6-hexane triol, trimethylol propane, pentaerythritol, sorbitol, glycerine and the like. The method of stabilizing compositions containing ester groups is applicable not only to monoesters but also to polyesters in accordance with the compounds listed above having a functionality greater than 1. For example, where any of the di- or polycarboxylic acids are reacted with the di- or polyhydric alcohols, a polyester having more than 1 ester group, of course, will result. The stabilization of the composition containing ester groups against hydrolysis increases as the number of ester groups in the molecule increases.

Of course, other compositions containing polyester resins as a reaction component or in admixture can also be stabilized by the process of this invention. For example, compositions such as polyester amides and polyester urethanes can be stabilized. The reaction product of any of the carboxylic terminated or hydroxyl terminated esters set forth above can be reacted with a suitable isocyanate to prepare a polyurethane. In the preparation of polyesteramides, the reaction of a carboxylic acid, an alcohol and an amine can be carried out simultaneously or in steps in the manner set forth for the preparation of polyurethanes. Of course, aminoalcohols and aminoacids can be used in the preparation of polyesteramides. The pertinent feature is, however, that any composition containing ester groups can be stabilized against hydroylsis by the introduction thereto of a polycarbodiimide having a molecular weight greater than 500 and more than 3 carbodiimide groups. The carbodiimide group referred to, of course, is a radical having two nitrogen atoms connected to a carbon atom by double bonds (—N=C=N—).

Any suitable polyisocyanate can be used in the preparation of polyester urethane by reaction with a polyester such as, any of those set forth below for use in preparing the polycarbodiimides.

Any suitable amino compound can be used to prepare polyesteramides such as, for example, hexamethylene diamine, ethylene diamine, propylene diamine, butylene diamine, cyclohexyl diamine, phenylene diamine, tolylene diamine, xylylene diamine, 4,4'-diamino-diphenylmethane, naphthylene diamine, aminoethyl alcohol, aminopropyl alcohol, aminobutyl alcohol, aminobenzyl alcohol, aminoacetic acid, aminopropionic acid, aminobutyric acid, aminovaleric acid, aminophthalic acid, aminobenzoic acid, and the like. Of course, the amino compounds may be reacted either simultaneously with the ester forming components or sequentially therewith.

It is also within the scope of this invention that naturally occuring esters may be stabilized against hydrolysis and ageing in accordance with this invention such as, for example, castor oil, cocoanut oil, corn oil, cottonseed oil, horse fat oil, lard oil, wool fat, japan wax, mutton tallow, beef tallow, neat's-foot oil, palm oil, peanut oil, carnauba wax, spermaceti, beeswax, rapeseed oil, soya bean oil, whale oil, sperm oil and the like. Further, any compositions containing ester groups as well as unsaturation may be stabilized in accordance with this invention. Such compositions may be formed by polymerization, condensation or a combination of both. Any of those unsaturated carboxylic acids mentioned above may be used in the preparation of such polyesters. Further examples of such compositions include polyester resins of polymerizable monomers such as styrene, and unsaturated polyesters, for example, those of fumaric or maleic acid as well as polyvinylesters such as polyvinylacetate and ethylene vinyl ester copolymers, acrylic and methacrylic acid ester polymers and their copolymers with vinyl esters, fluorinated acrylic esters and their copolymers, copolymers of acrylonitrile and acrylic acid esters such as methylacrylate and the like.

Any suitable polycarbodiimide having more than three carbodiimide groups and a molecular weight of at least 500 with the proviso that at least one carbodiimide group is present for each molecular weight unit of 1,500 may be used to stabilize compositions containing ester groups. These materials are generally substances of a highly viscous to resinous nature and depending on their molecular weight, they are substances which are more or less sparingly soluble or insoluble in organic solvents. These polycarbodiimides can be prepared from isocyanates. In this event they may contain —NCO groups which permit the additional incorporation into the ester containing composition by reaction of the —NCO groups with any active hydrogen atoms present in the ester composition.

Any suitable polycarbodiimide may be used such as those obtained in accordance with U.S. Patent 2,941,966 which describes a process of preparing polycarbodiimides using polyisocyanates in the presence of catalytic quantities of phospholines and their oxides and sulfides. The patent also describes a high molecular weight plastic having a plurality of ester groups and several carbodiimide groups as one of the chain-linking groups. This rubber-like polymer, however, contains one carbodiimide group for each molecular weight unit of about 2,500. Such a number of carbodiimide groups as compared with the molecular weight of the material and its physical properties resulting from its high molecular weight makes this material unsuccessful for the purpose of the present invention, i.e. for stabilizing ester groups containing compositions against hydrolytic influences. It is very difficult, if possible at all to homogeneously incorporate such a material into the polyester compositions to be stabilized.

Any suitable polyisocyanates may be used in accordance with this procedure to prepare polycarbodiimides such as, for example, toluylene diisocyanate, 4,4'-diphenylmethane diisocyanate, m-phenylene diisocyanate, 1,5-naphthylene diisocyanate, 4-chloro-1,3-phenylene diisocyanate, tetramethylene diisocyanate, hexamethylene diisocyanate, 1,4-dicyclohexyl diisocyanate, 1,4- cyclohexyl diisocyanate and 2,4,6-toluylene triisocyanate. Other suitable polycarbodiimides can also be prepared in accordance with the procedure set forth in copending application Serial No. 110,651 which describes a method wherein aromatic diisocyanates or polyisocyanates having one or two aryl, alkyl, aralkyl or alkoxy substituents in the ortho position to all —NCO groups wherein at least one of these substituents has at least two carbon atoms are heated in the presence of tertiary amines, basically reacting metal compounds, carboxylic acid metal salts or non-basic organo-metallic compounds. Isocyanates suitable in the preparation of carbodiimides in accordance with the disclosure of this application include 1,3 - diisopropylphenylene - 2,4 - diisocyanate, 1-methyl-3,5-diethylphenylene-2,4-diisocyanate, 1,3,5 - triethylphenylene-2,4-diisocyanate, 1,3,5-triisopropylphenylene-2,4-diisocyanate, 3,3'-diethyl-bisphenyl-4,4'-diisocyanate, 3,5,3',5'-tetraethyl-diphenylmethane - 4,4'-diisocyanate, 3,5,3',5'-tetraisopropyldiphenylmethane-4,4'-diisocyanate 1-ethyl-4-ethoxy-phenyl-2,5-diisocyanate, 1,3,5-triethyl benzene-2,4,6-triisocyanate, 1-ethyl-3,5-diisopropyl benzene-2,4,6-triisocyanate and 1,3,5-triisopropyl benzene-2,4,6-triisocyanate.

If it is not desirable to have polycarbodiimides containing —NCO groups to react with the ester containing composition, the —NCO groups can be modified by reaction with compounds containing active hydrogen atoms such as alcohols, phenols, or amines.

Although the presence of any amount of a polycarbodiimide in accordance with this invention will improve the hydrolysis and ageing resistance of the ester containing compositions, it is preferred that a quantity in the amount of from about 0.1 to about 10 percent by weight be used. The process of this invention for stabilizing ester-containing compositions encompasses the addition of the polycarbodiimide to the ester by rolling, melting or stirring in a solid or dissolved condition, by addition to the starting components or to the finished product or to any intermediate products which may be prepared.

The advantage arising from the use of polycarbodiimides as age-resistors constitutes, among other things, that they show a substantially lower volatility and capacity for extraction by solvents or mineral oils. Further, as compared with the monocarbodiimides, the polycarbodiimides show an improved efficiency and can be handled without being physiologically objectionable as they have a low vapor pressure.

The invention is further illustrated by the following examples in which parts are by weight unless otherwise specified.

*Example 1*

A storable polyurethane mass is prepared by reacting an hydroxyl polyester prepared by reacting ethylene glycol, propylene glycol present in a ratio of 80:20 respectively with adipic acid to an —OH number of about 60 with about 17 percent of 4,4'-diphenylmethane diisocyanate and 1.5 percent of butanediol. The substances indicated in the following table are incorporated into the polyurethane composition in the proportions set forth in the table by using a rubber roller.

|  | A | B | C |
|---|---|---|---|
| Polyurethane composition | 100 | 100 | 100 |
| Carbon black (intermediate superabrasion furnace) | 20 | 20 | 20 |
| Stearic acid | 1 | 1 | 1 |
| Tertiary-butyl-cumylperoxide | 3 | 3 | 3 |
| Triallyl cyanurate | 1 | 1 | 1 |
| Dicyclohexylcarbodiimide |  | 4 |  |
| Triisopropylbenzene polycarbodiimide |  |  | 4 |

The triisopropyl benzene polycarbodiimide utilized in this example is prepared by heating 1,3,5-triisopropyl-benzene-2,4-diisocyanate with about 3 parts of permethylated triethylene tetraamine for about 22 hours at a temperature of about 200° C. Strong evolution of carbon dioxide takes place. The cooled reaction product is taken up in petroleum ether and filtered until clear. The solvent is removed by distillation under partial vacuum at a temperature of from about 152 to 162° C. and 0.05 mm. Hg. The polycarbodiimide product is a light-colored to dark brown resin which is soluble in aromatic and aliphatic hydrocarbons, chlorobenzene, dioxane and the like. The softening point is about 190 to about 200° C.

The test examples obtained from the mixtures A, B and C are vulcanized in a vulcanizing press for 40 minutes at 151° C. to determine the physical properties of each example.

The following tests were run using a sample of each of those prepared above, A, B, and C to determine the effects of different ageing conditions.

(1) Hydrolysis ageing at 70° C. and 95 percent relative air humidity. The first figure in each case indicates the tensile strength in kg./cm.$^2$ and the second the elongation in percent.

|  | A | B | C |
|---|---|---|---|
| 0 days | 300/540 | 310/550 | 340/500 |
| 3 days | 174/670 | 198/640 | 308/530 |
| 7 days | 81/700 | 186/660 | 290/545 |
| 14 days | Destroyed | 108/685 | 248/560 |
| 21 days | Destroyed | 41/835 | 190/590 |

(2) Resistance to water at 100° C. The figures again indicate the tensile strength in kg./cm.$^2$ and the elongation in percent.

|  | A | B | C |
|---|---|---|---|
| 0 days | 407/550 | 387/560 | 436/525 |
| 1 day | 141/690 | 204/585 | 346/530 |
| 2 days | Destroyed | 85/585 | 250/545 |
| 3 days | Destroyed | 34/680 | 104/630 |
| 4 days | Destroyed | Destroyed | 57/695 |

(3) Resistance to hot oil (ASTM oil No. III, 100° C). The figures indicate the Shore hardness.

|  | A | B | C |
|---|---|---|---|
| 0 days | 56 | 61 | 64 |
| 3 days | 41 | 52 | 62 |
| 7 days | 23 | 38 | 62 |

(4) Resistance to hot air at 125° C. The figures indicate the tensile strength in kg./cm.$^2$ and the elongation in percent.

|  | A | B | C |
|---|---|---|---|
| 0 days | 300/540 | 310/550 | 340/505 |
| 7 days | 215/505 | 112/575 | 291/545 |
| 14 days | 127/410 | 104/470 | 238/475 |
| 21 days | 102/375 | 88/415 | 230/475 |

(5) Resistance to solvent extraction (Soxhlet, light benzine). The figures show the percentage loss in weight.

|  | A | B | C |
|---|---|---|---|
| 1 day | −1.30 | −2.48 | −1.15 |
| 2 days | −1.51 | −2.87 | −1.38 |
| 7 days | −1.72 | −3.46 | −1.53 |

(6) Resistance of the specimens extracted according to 5) to the tests 1–4: Whereas the extracted samples of the mixtures B in the tests according to 1–4 show a decrease corresponding to the mixture A, the resistance of the mixture C treated by extraction is practically unchanged as compared with the untreated mixture C.

*Example 2*

A mixture of 392 parts of maleic anhydride and 335 parts of propylene glycol is heated at about 200° C. for about 4 hours while passing a slow stream of carbon dioxide through the stirred reaction mixture. The reaction is then continued for about 1.5 hours under a reduced pressure of less than 50 mm. After a total reaction time of 6 hours an alkyd having an acid number of 9 results. To 100 parts of the alkyd resin is added 5 parts of a polycarbodiimide prepared from 2,4,6-triethyl phenylene-1,3-di-isocyanate which is heated in the presence of about 0.4 part of sodium phenylate at a temperature of about 170° C. The hydrolysis resistance of this material is increased by the addition of the polycarbodiimide.

Although the working examples are limited to several specific compositions it would be impossible to indicate every type of ester containing composition which can be stabilized against hydrolysis and ageing by the addition of a polycarbodiimide in accordance with this invention. It is pointed out that the ester linkage is the point in the molecule which is subject to attack by hydrolysis and any composition which contains such a linkage will be subject to this disadvantage. It has been found that the presence of the polycarbodiimide increases the hydrolysis resistance and ageing of the particular composition containing the ester linkages.

Although the invention has been described in considerable detail for the purpose of illustration, it is to be understood that variations can be made by those skilled in the art without departing from the spirit of the invention and the scope of the claims.

*Example 3*

The substances indicated in the following table are combined in the proportions by weight set forth in the table.

|  | A | B |
|---|---|---|
| Ethylenevinylacetate copolymerisate with 45% acetate | 100 | 100 |
| Stearic acid | 1 | 1 |
| High activated silicic acid | 30 | 30 |
| Dicumyl peroxide | 2,5 | 2,5 |
| Triallylphosphate | 4 | 4 |
| 1,3,5-Triisopropyl benzene polycarbodiimide |  | 5 |

The test examples obtained from the mixtures A and B are vulcanized in a vulcanizing press for 40 minutes at 151° C. to determine the physical properties of each example. The tests were run using a sample of each of those prepared above under A and B. The ageing in hot air is determined at 200° C. The first figure gives the tensile strength in kg./cm.$^2$ and the second the elongation in percent.

|  | A | B |
|---|---|---|
| 0 days | 189/355 | 190/435 |
| 1 day | 47/110 | 163/320 |
| 2 days | 30/45 | 145/295 |
| 3 days | 12/20 | 100/195 |
| 4 days | Destroyed | 54/110 |
| 5 days | Destroyed | 44/45 |

*Example 4*

A wax-like condensation product is prepared from adipic acid, ethylene glycol and monoethanol amine which is then reacted with hexamethylene diisocyanate to give a rubber-like storage stable material (Mooney plasticity 45–50; four minutes, 100° C.).

The substances indicated in the following table are incorporated into the polyurethane composition in the proportions set forth in the table by using a rubber roller.

|  | A | B |
|---|---|---|
| Polyurethane composition | 100 | 100 |
| Stearic acid | 1 | 1 |
| Semireinforcing furnace black | 60 | 60 |
| Hexamethylol melamine | 5 | 5 |
| Chloro naphthol | 1 | 1 |
| Triisopropyl benzene polycarbodiimide | | 4 |

The test examples obtained from the mixtures A and B are vulcanized in a vulcanizing press for 40 minutes at 151° C. and 4 atmospheres. They show the following mechanical properties:

|  | A | B |
|---|---|---|
| Tensile strength (kg./cm.²) | 114 | 90 |
| Elongation (percent) | 315 | 250 |
| Shore hardness | 61 | 60 |
| Elasticity (percent) | 28 | 30 |

The test plates are stored for 6 hours in water at 95° C. The following table gives the decrease or increase of the mechanical properties in percent.

|  | A, percent | B, percent |
|---|---|---|
| Tensile strength | −68 | −43 |
| Elongation | −42 | +5 |

*Example 5*

A polyester urethane prepared from 57 parts by weight of a polyester made from adipic acid, ethylene glycol and propylene glycol, 33 parts by weight of 4,4′-diphenyl methane diisocyanate and 10 parts by weight of glycerol mono allyl ether are vulcanized with sulfur on a rubber roller by incorporating into the polyurethane composition the following ingredients in the proportions set forth in the table.

|  | A | B |
|---|---|---|
| Polyester urethane | 100 | 100 |
| Stearic acid | 1 | 1 |
| Pyrogenic silicic acid | 15 | 15 |
| Cadmium stearate | 0,5 | 0,5 |
| Sulfur | 2 | 2 |
| 2-Mercapto-benzothiazol | 2 | 2 |
| Mercapto-benzo-thiazyl-disulphide | 1 | 1 |
| Addition product of 1 mol of mercapto-benzo-thiazyl-disulphide and 1 mol of stannous chloride | 0,5 | 0,5 |
| Triisopropylpolycarbodiimide | | 4 |

The compositions are vulcanized in a vulcanizing press for 40 minutes at 121° C. The following tests were run using a sample of each of those prepared above under A and B determining the effects of different ageing compositions by holding them in water of 95° C.

| Days |  | A | B |
|---|---|---|---|
| 0 | Tensile strength (kg./cm.²) | 349 | 325 |
|  | Elongation (percent) | 805 | 800 |
| 1 | Tensile strength (kg./cm.²) | 92 | 195 |
|  | Elongation (percent) | 795 | 630 |
| 2 | Tensile strength (kg./cm.²) | 18 | 127 |
|  | Elongation (percent) | 910 | 685 |
| 3 | Tensile strength (kg./cm.²) | Destroyed | 98 |
|  | Elongation (percent) | Destroyed | 790 |
| 4 | Tensile strength (kg./cm.²) | Destroyed | 38 |
|  | Elongation (percent) | Destroyed | 635 |
| 5 | Tensile strength (kg./cm.²) | Destroyed | 26 |
|  | Elongation (percent) | Destroyed | 770 |

*Example 6*

A storable polyurethane mass is prepared by reacting 100 parts by weight of an hydroxyl polyester prepared by thermal esterification of diethylene glycol with adipic acid (OH number 52), 4.5 parts by weight of 1-butylene glycol and 12.9 parts by weight of an isomeric mixture of 2,4- and 2,6-toluylene diisocyanate. The components are mixed at room temperature and heated for 15 hours to 90° C. to give a plastic material with terminal hydroxyl groups. On a rubber roller the material is worked with 0.5 part by weight of stearic acid to give a smooth sheet.

100 parts by weight of the smooth sheet are incorporated into 200 parts by weight of carbon black (intermediate superabrasion furnace) and 10 parts by weight of the dimer of 2,4-toluylene diisocyanate. The composition is vulcanized for 20 minutes at 130° C. under a specific pressure of 25 kg./cm.².

The following table indicates under A the physical properties of the vulcanized material and the decrease of the tensile strength after ageing at 70° C. and 95% humidity within the period indicated.

Another sample is made under the very same conditions with the only difference of adding 3 parts by weight of polymeric 1,3,5-triisopropyl benzene polycarbodiimide directly after the addition of the carbon black. The physical properties of a test plate as well as its behaviour after ageing are indicated in the table under B.

|  | A | B |
|---|---|---|
| Tensile strength (kg./cm.²) | 230 | 235 |
| Breaking elongation (percent) | 680 | 670 |
| Shore hardness A (degrees) | 81 | 80 |
| Rebound elasticity (percent) | 44 | 44 |
| Resistance to further tearing according to Graves, kg./cm. | 75 | 74 |
| Tensile strength (kg./cm.²) after— |  |  |
| 1 week | 80 | 225 |
| 2 weeks | 12 | 190 |
| 3 weeks | Destroyed | 165 |
| 4 weeks | Destroyed | 110 |
| 5 weeks | Destroyed | 70 |

*Example 7*

The following compositions A and B are prepared on a mixing roller. The indicated parts are by weight. The 1-methyl-3,5-diethyl benzene polycarbodiimide is prepared from 1-methyl-3,5-diethyl phenylene-2,4-diisocyanate at 190° C. by adding 0.5% of alcoholic potassium hydroxide.

|  | A | B |
|---|---|---|
| Polyacrylic acid ethyl ester (plasticity Mooney 100° C.; 60) | 100 | 100 |
| Stearic acid | 1 | 1 |
| Carbon black (superabrasion furnace) | 50 | 50 |
| Dicumylperoxide | 3,2 | 3,2 |
| Triallylcyanurate | 4,0 | 4,0 |
| 1-Methyl-3,5-diethyl benzene polycarbodiimide | | 3 |

Test plates are made from the mixtures A and B by vulcanizing for 45 minutes at 151° C. The following mechanical properties are found:

|  | A | B |
|---|---|---|
| Tensile strength (kg./cm.²) | 77 | 81 |
| Elongation (percent) | 260 | 250 |
| Shore hardness room temp | 55 | 56 |
| 75°C | 46 | 46 |
| Rebound elasticity (percent) room temperature | 9 | 10 |
| 75°C | 22 | 21 |
| Compression set (ASTM 90): |  |  |
| 22 hours/70° | 13 | 15 |
| 70 hours/100° | 37 | 41 |

Under hydrolytic influence the test plate B having incorporated the polycarbodiimide had a 4–5 fold life time.

*Example 8*

A polycarbodiimide has been prepared from 3,5,3′,5′-tetraisopropyl diphenyl methane-4,4′-diisocyanate at 200° C. with 1% of alcoholic sodium hydroxide. 3 parts by weight of this polycarbodiimide are added to each 100 parts by weight of a melt of polyvinyl acetate of a molecular weight of 70,000 at 70° C. After cooling the polyvinyl acetate thus stabilized exhibits a remarkable resistance against saponification and thermal degradation.

What is claimed is:
1. A method for stabilizing organic ester containing compositions which comprises adding to the said composition a stabilizing amount of a polycarbodiimide having a molecular weight of at least about 500 and having more than 3 carbodiimide groups, with the proviso that at least one carbodiimide group is present for each molecular weight unit of 1,500.
2. A method for stabilizing polyesters which comprises adding to said polyesters a stabilizing amount of a polycarbodiimide having a molecular weight of at least about 500 and having more than 3 carbodiimide groups, with the proviso that at least one carbodiimide group is present for each molecular weight unit of 1,500.
3. A method for stabilizing polyester urethanes which comprises adding to the said polyester urethane a stabilizing amount of a polycarbodiimide having a molecular weight of at least about 500 and having more than 3 carbodiimide groups, with the proviso that at least one carbodiimide group is present for each molecular weight unit of 1,500.
4. A polyester composition containing as a hydrolysis and ageing stabilizer therefor, a stabilizing amount of a polycarbodiimide having a molecular weight of at least about 500 and containing more than 3 carbodiimide groups, with the proviso that at least one carbodiimide group is present for each molecular weight unit of 1,500.
5. A method for stabilizing organic ester containing compositions which comprises adding to the said composition from about 0.1 to about 10 percent by weight of a polycarbodiimide having a molecular weight of at least about 500 and having more than 3 carbodiimide groups, with the proviso that at least one carbodiimide group is present for each molecular weight unit of 1,500.
6. A method for stabilizing polyesters which comprises adding to the said polyester from about 0.1 to about 10 percent by weight of a polycarbodiimide having a molecular weight of at least about 500 and having more than 3 carbodiimide groups, with the proviso that at least one carbodiimide group is present for each molecular weight unit of 1,500.
7. A method for stabilizing polyester urethanes which comprises adding to the said polyester urethane from about 0.1 to about 10 percent by amount of a polycarbodiimide having a molecular weight of at least about 500 and having more than 3 carbodiimide groups, with the proviso that at least one carbodiimide group is present for each molecular weight unit of 1,500.
8. A polyester composition containing as a hydrolysis and ageing stabilizer therefor from about 0.1 to about 10 percent by weight of a polycarbodiimide having a molecular weight of at least about 500 and containing more than 3 carbodiimide groups, with the proviso that at least one carbodiimide group is present for each molecular weight unit of 1,500.
9. A polyester-urethane composition containing as a hydrolysis and ageing stabilizer therefor from about 0.1 to about 10 percent by weight of a polycarbodiimide having a molecular weight of at least about 500 and containing more than 3 carbodiimide groups, with the proviso that at least one carbodiimide group is present for each molecular weight unit of 1,500.

References Cited by the Examiner
UNITED STATES PATENTS 2,941,983   6/60   Smeltz _____ 260—77.5

LEON J. BERCOVITZ, *Primary Examiner.*

MILTON STERMAN, *Examiner.*